United States Patent [19]

Petrie et al.

[11] 4,240,992
[45] Dec. 23, 1980

[54] TECHNIQUE FOR FABRICATING RADIATION SENSITIVE DOSIMETERS

[75] Inventors: Edward M. Petrie, Pittsburgh; John G. Seidel, McCandless; Patrick E. Felice, Lincoln Heights, all of Pa.

[73] Assignee: Westinghouse Electric Corp., Pittsburgh, Pa.

[21] Appl. No.: 892,813

[22] Filed: Apr. 3, 1978

[51] Int. Cl.² ............................................. C09K 11/42
[52] U.S. Cl. .................................... 264/21; 250/483; 264/63; 264/175
[58] Field of Search .................... 264/21, 63, 86, 175; 250/483

[56] References Cited

U.S. PATENT DOCUMENTS

| 1,532,795 | 4/1925 | Balch | 264/21 |
|---|---|---|---|
| 2,588,569 | 3/1952 | Picard | 264/21 |
| 2,728,870 | 12/1955 | Gungle et al. | 250/483 |
| 2,774,682 | 12/1956 | Larach | 250/483 |
| 2,857,541 | 10/1958 | Etzel et al. | 250/483 |
| 3,402,293 | 9/1968 | Shambon | 264/21 |
| 3,471,699 | 10/1969 | McCall | |
| 3,883,748 | 5/1975 | Nada et al. | 250/484 |
| 4,053,772 | 10/1977 | Felice | 250/337 |

FOREIGN PATENT DOCUMENTS 1291828  10/1972  United Kingdom ............. 250/483

Primary Examiner—John A. Parrish
Attorney, Agent, or Firm—M. P. Lynch

[57] ABSTRACT

The finely-divided particles of a selected phosphor material are combined with an aqueous solution of a suitable binder material to form an emulsion which is spread uniformly on the smooth surface of a support member. The wet coating is then heated to remove the water and the resulting film is sintered to produce a strong, continuous film. The film is then peeled from the support member resulting in a uniformly thick sheet of phosphor and binder from which dosimeters can be cut or stamped to any desired size.

6 Claims, 2 Drawing Figures

TECHNIQUE FOR FABRICATING RADIATION SENSITIVE DOSIMETERS

BACKGROUND OF THE INVENTION

The ever increasing demands for energy and the continuing development and significance of nuclear energy has resulted in countless techniques for the exploration of uranium. One characteristic which is now being considered to identify the location of uranium deposits involves the monitoring of radon emanating from the earth. A particularly suitable technique for monitoring radon as an indication of potential uranium deposits includes the positioning of radon responsive dosimeters a few feet beneath the surface of the earth and the subsequent reading of the dosimeters to determine the level of radon emanating from a particular site. The application of radon responsive dosimeters, such as calcium sulfate activated by dysprosium ($CaSO_4:Dy$) for uranium detection is described and illustrated in U.S. Pat. No. 4,053,772, issued Oct. 11, 1977, assigned to the assignee of the present invention and incorporated herein by reference. The mechanism for determining the presence of radon is the alpha-sensitivity of the dosimeter. When alpha-particles from radon strike the dosimeter electrons in the dosimeter material are raised to a higher energy level. These electrons are trapped, as described in the above-referenced U.S. patent, until the dosimeter material is heated, whereupon the electrons move to the conduction band and then return to their original valence band. During this movement, light energy is emitted and the measurement of the light energy emitted is measured as an indication of the presence of uranium.

While commercially available dosimeters, or phosphor compositions as identified above, are suitable for alpha storage, non-uniformity in the dimensions of the dosimeter can result in a misleading interpretation of the radon concentration. Furthermore, the techniques for fabricating commercial dosimeters, which typically consist of slicing bar stock, limit the practical effective diameter of the dosimeters. Commercial dosimeters presently available are nominally 0.6 centimeters in diameter and 0.02 millimeters in thickness. Efforts to slice dosimeter wafers from bars of larger diameters has proven unsatisfactory. The problems encountered in the larger diameter bar stock are due in part to the phosphor powder itself. Efforts to increase the concentration of phosphor material as occurs when larger diameter bars are developed, increases the susceptibility of the bar to flaking or chipping. Poor uniformity in thickness plus dimensional irregularities can result if the phosphor content is too high. While increase phosphor content improves dosimeter sensitivity, efforts to commercially produce dosimeter wafers of an effective diameter larger than 0.6 centimeters at phosphor concentrations of greater than 33% have not proven commercially practical. Thus, a requirement for a larger diameter dosimeter necessitates an undesirable reduction in the phosphor content.

SUMMARY OF THE INVENTION

An emulsion of a suitable substrate material, i.e., Teflon, and a selected phosphor, i.e., $CaSO_4:Dy$ is made by mixing together finely-divided phosphor particles, i.e., finer than 200 mesh, with an aqueous polytetrafluoroethylene dispersion, commercially available from E. I. Depont deNemours and Company under the trade name Teflon 30 TFE. The Teflon serves as a binder material for the phosphor. A non-ionic wetting agent, surfactant, contained in the commercially available TFE dispersion, aids in the mixing of this dispersion. The surfactant in this instance is Triton X100. The surfactant serves to maintain the Teflon particles in suspension in the aqueous polytetrafluoroethylene dispersion and prevents clumping of the Teflon particles.

The phosphor particles constitute at least 34% by weight of the solids content of the emulsion. The maximum ratio of phosphor to Teflon is governed by the practical mechanical strength of the final film. Experimentation indicated that this concentration can be increased to as much as 75%. The ability to increase the percent by weight content of the phosphor above the 34% level of commercially available dosimeters permits significant increase in the sensitivity of the resulting dosimeter. A technique for forming dosimeter wafers is disclosed in U.S. Pat. No. 3,471,699. This technique employs dry ingredients which are compressed and heated and cooled under pressure. The dosimeter composition is limited to a phosphor to binder weight ratio of 1:2, wherein the phosphor by weight content is approximately 33%.

Once the emulsion of the subject invention is thoroughly mixed, it is applied onto a smooth surface support member and spread evenly over the surface to form a layer having a thickness which, following removal of the water, will produce a dosimeter film of desired thickness. Following the spreading of the emulsion, the emulsion is heated to remove the water and the resulting film is sintered to produce a strong continuous film. The film is then peeled from the support member. Dosimeters of desired size and shape are then cut or stamped from the film with the result that the dosimeters may have effective diameters substantially greater than 0.6 centimeters.

DESCRIPTION OF THE DRAWINGS

The invention will become more readily apparent from the following exemplary description in connection with the drawings.

DESCRIPTION OF THE PREFERRED EMBODIMENT

Figure 1:
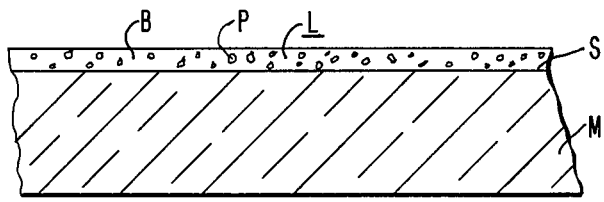
FIG. 1 is a magnified sectioned illustration of the invention.
Figure 2:
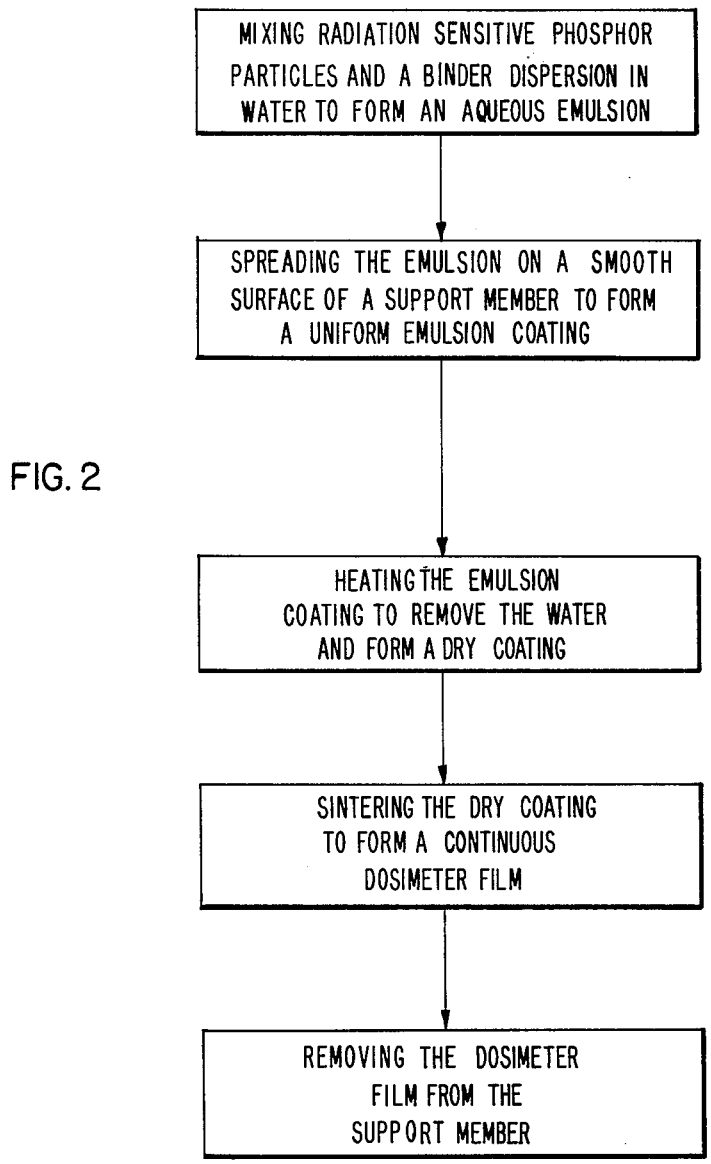
FIG. 2 is a flow chart of the process steps defining the unique dosimeter fabrication technique illustrated in FIG. 1.

Referring to FIGS. 1 and 2 there is disclosed a novel technique for fabricating uniformly thick radiation dosimeter sheet material having surface areas substantially greater than that achievable from conventional dosimeter fabrication methods.

The most significant departure from the prior art techniques is the concept of forming an aqueous emulsion which permits the uniform spreading of a relatively thin layer L of a phosphor particle P and binder B composition on the smooth surface S of a support member M for the fabrication of large surface area, uniformly thick dosimeter sheet material.

For the purposes of discussion, the phosphor material selected is calcium sulfate activated by dysprosium ($CaSO_4:Dy$) and the aqueous binder solution is an aqueous polytetrafluoroethylene dispersion containing resin particles of between 0.05 and 0.5 microns. The calcium sulfate-dysprosium phosphor is selected for the purposes of discussion inasmuch as it exhibits the desired alpha-sensitivity which renders it particularly suitable for uranium detection operations as described in the above-referenced U.S. Patent. It is apparent that other phosphor materials can be substituted in accordance with the operational requirements of the dosimeter. Various calcium sulfate phosphor mixes are described in U.S. Pat. No. 3,883,748. While Teflon, as described above as the aqueous binder solution, is particularly suitable for dosimeter fabrication, other materials such as silicon rubber, when thinned with a solvent such as trichloroethylene also works effectively as a binder for the phosphor powder. Similarly, polyimide has been successfully employed as a binder.

Referring now to the process steps of FIG. 2, the novel dosimeter fabrication technique consists of the following steps:

1. Mixing radiation sensitive phosphor particles of approximately 200 mesh size or finer and a binder dispersion in water to form an aqueous emulsion;
2. Spreading the emulsion on a smooth surface of a support member to form a uniform emulsion coating;
3. Heating the emulsion coating to remove the water and form a dry coating;
4. Sintering the dry coating to form a continuous dosimeter film; and
5. Removing the dosimeter film from the smooth surface of the support member.

In the above process, it has been determined experimentally, that a heating temperature of approximately 120° C. will effectively remove the water and form a dry coating, while a temperature of approximately 370° C. will effect the desired sintering which yields a strong continuous dosimeter film. The sintering step will also remove much or all of the wetting agent or surfactant, of the binder dispersion. Experimentally it has been determined that sintering should occur for at least three hours to achieve the desired results. Experimentation has further indicated that an aqueous coating of approximately 4.5 mills spread over a smooth surface of a support member will yield a dosimeter film of approximately 2.0 mills.

The size of the phosphor particles and the viscosity of the aqueous emulsion are critical considerations. If the phosphor particle size is much larger than 200 mesh, there is a tendency for the phosphor particles to settle out of the emulsion and not remain completely encapsulated by the binder.

It has been determined experimentally that the amount of water added to the phosphor particles and binder dispersion should be such as to form an aqueous emulsion with a viscosity greater than 30 centipose, i.e., approximately 60 centipose. The upper limit of the viscosity would be that at which "caking" would occur.

What is claimed is:

1. A method of fabricating a peelable alpha responsive radiation dosimeter film, comprising the steps of,
   mixing thermoluminescent radiation sensitive phosphor particles and a binder particle dispersion in water to form an aqueous emulsion of phosphor particles and binder particles in suspension, said aqueous emulsion having a viscosity of 30 centipose or greater,
   spreading the emulsion onto the surface of a support member to form a uniformly thick emulsion coating, said thickness being such that the removal of water results in a dosimeter coating of a thickness which renders the dosimeter coating responsive to alpha radiation,
   heating the emulsion coating to remove the water and form a dry dosimeter coating of phosphor particles and binder particles of a thickness which renders the dosimeter coating responsive to alpha radiation,
   sintering the dry dosimeter coating to form a continuous alpha responsive dosimeter film, said binder being such that said dosimeter film is a peelable dosimeter film, and
   peeling said alpha responsive dosimeter film from said support member.

2. A method as claimed in claim 1 wherein said radiation sensitive phosphor particles are of a 200 mesh size or finer.

3. A method as claimed in claim 1 wherein the heating of the emulsion coating is to a temperature of approximately 120° C.

4. The method as claimed in claim 1 wherein the sintering of the dry coating is achieved by heating the dry coating to a temperature of approximately 370° C.

5. A method as claimed in claim 1 wherein said binder particle dispersion in water is a aqueous polytetrafluoroethylene dispersion containing a surfactant for maintaining the binder particles in suspension, wherein said sintering step occurs for at least three hours to move said surfactant.

6. A method as claimed in claim 1 further including the step of cutting or stamping dosimeter elements from said dosimeter film following the peeling of said dosimeter film from said support member.

* * * * *